Feb. 3, 1942. E. H. DOUGHTY 2,271,511
CRANKPIN BEARING
Filed Jan. 2, 1941 3 Sheets-Sheet 2
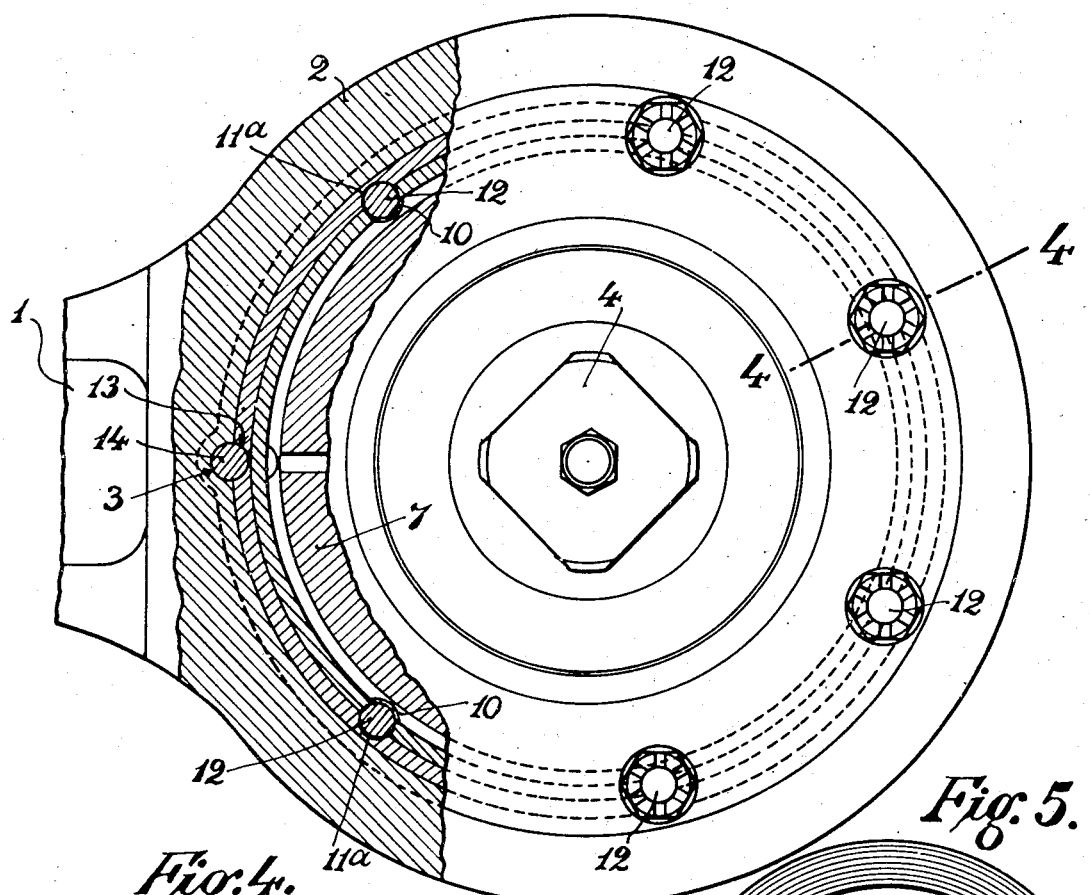
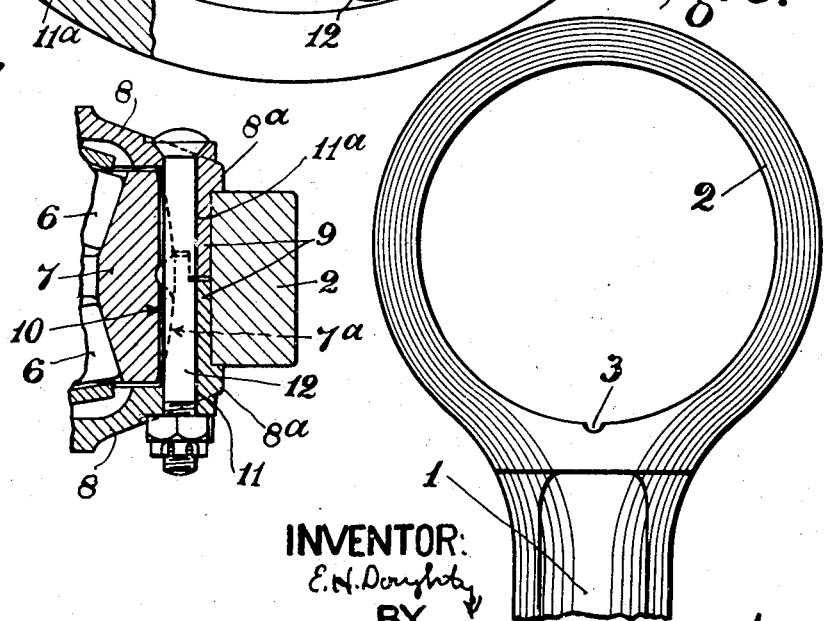
INVENTOR:
E. H. Doughty
BY
His ATTORNEYs.

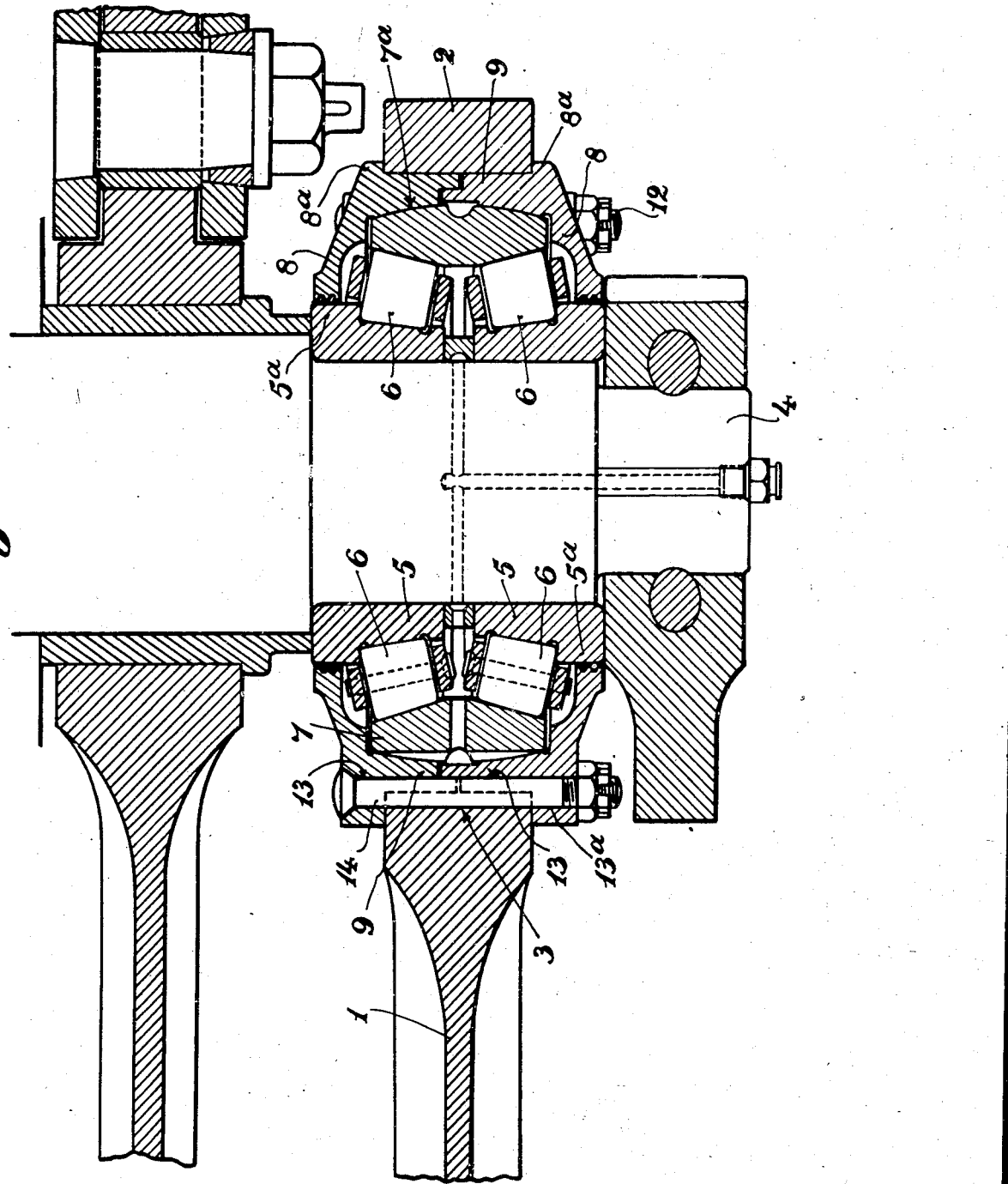

Feb. 3, 1942. E. H. DOUGHTY 2,271,511
CRANKPIN BEARING
Filed Jan. 2, 1941 3 Sheets-Sheet 3

INVENTOR:
Eldred Herbert Doughty
BY Carr Kerr Gravely
His ATTORNEYS.

Patented Feb. 3, 1942

2,271,511

UNITED STATES PATENT OFFICE 2,271,511

CRANKPIN BEARING

Eldred Herbert Doughty, Birmingham, England, assignor to The Timken Roller Bearing Company, Canton, Ohio, a corporation of Ohio Application January 2, 1941, Serial No. 372,771
In Great Britain January 17, 1940

6 Claims. (Cl. 308—72)

This invention relates to the bearing ends of locomotive and other connecting or coupling rods, eccentric rods, and the like, said ends being of the kind comprising an eye or ring encircling the crank-pin, or other pin or the like, and containing a bearing member enclosed at opposite sides by covers.

The principal object of the present invention is to provide a compact design of rod end and bearing the dimensions and weight of which are kept as small as possible so as to simplify the balancing of the moving parts and to reduce cost; in which the bearing-enclosing side covers are connected to the eye of the rod without the necessity of drilling and thereby weakening the latter and enabling a solid forged eye to be used with a roller bearing; and which provides a self-aligning feature to allow for relative movements in the locomotive or the like tending to throw the pin at one end of the rod out of parallel with the pin at the other end, which feature avoids the undesirable high stresses which would otherwise be set up in the rod, pin and bearing by the out-of-parallel condition.

According to the invention, the side covers are provided with transverse annular extensions which project inwardly and fit within the eye or ring of the rod and together form a spherical housing for the bearing member which is formed with a corresponding spherical engaging surface, said bearing member being flexibly or rockably keyed or anchored to the housing by one or more bolts which engage grooves or recesses in adjacent parts and pass through and secure the covers. The housing may be keyed to the eye by a bolt or bolts engaging grooves in the two parts, the grooves being so positioned that the strength of the rod is not affected. The side covers may be clamped to the end of the rod by a plurality of bolts passing through holes in the covers and through transverse grooves or recesses, formed as continuations of the said holes, in the spherical surface of the housing, the said bolts engaging transverse registering grooves in the engaging spherical surface of the bearing member, the bolts being a loose fit within the grooves in the bearing member, so that the latter may move slightly relatively to the housing in a transverse direction for self-alignment purposes, whilst being prevented from rotating relatively thereto. The bearing is preferably of the anti-friction type comprising inner and outer bearing members or races separated by rollers or balls, the outer bearing member or race having a spherical outer surface to engage the spherical surface of the housing formed by the cover extensions.

Figure 1 of the accompanying drawings represents a section through the crank-pin bearing of a locomotive connecting rod, the bearing being of the tapered roller type and being enclosed by covers having extensions forming a spherical housing for the outer bearing member, means being provided, in accordance with this invention, for permitting of a transverse rocking movement of the latter whilst preventing the same from rotating relatively to the housing.

Figure 2 is a side elevation, partly in section, of the eyed end of the connecting rod, showing one of the side covers and the bolts for loosely keying the outer bearing member to the housing and for keying the latter to the eye of the rod.

Figure 4 is a cross-section on the line 4—4, Figure 2.

Figure 5 shows how the fibres extend around the eye of the rod.

Figure 3:
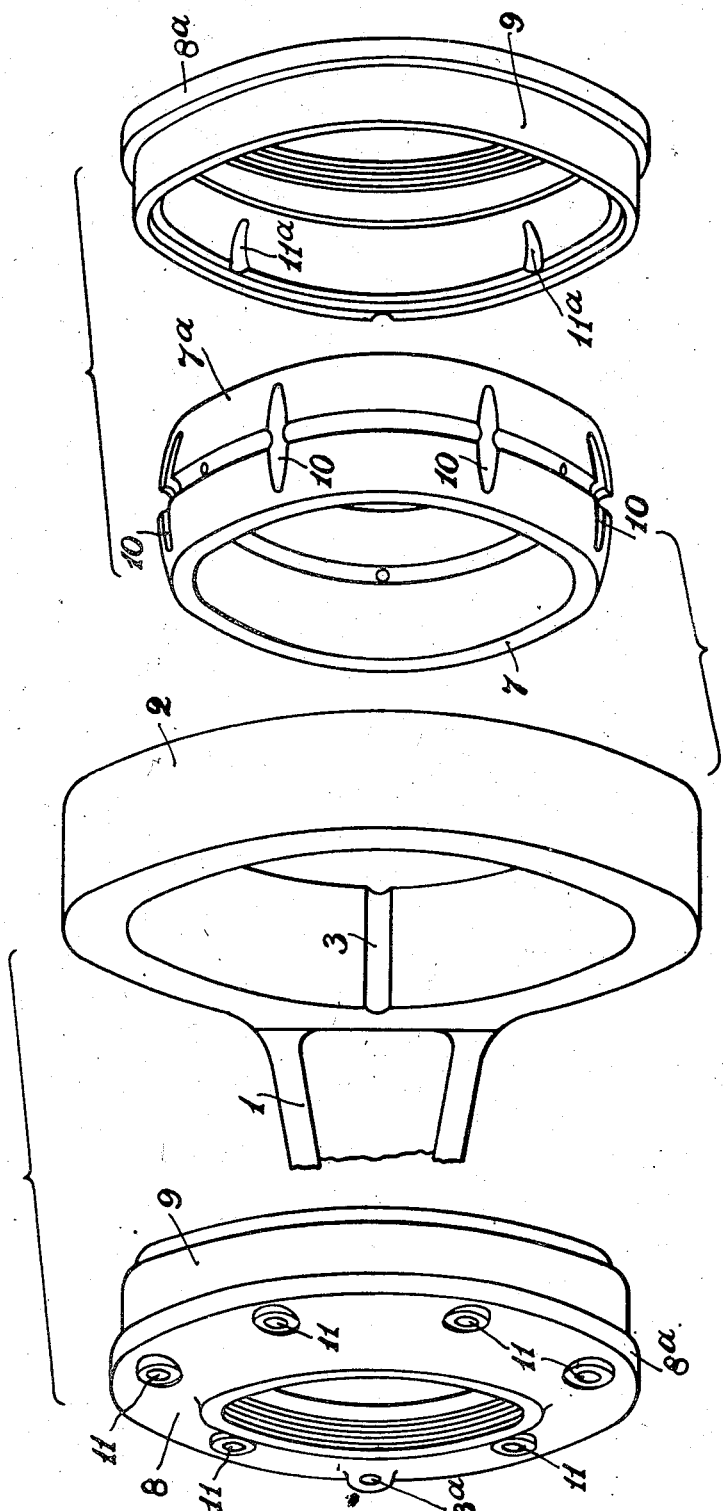
Figure 3 shows perspective views of the side covers for enclosing the bearing and of the outer race member, the said parts being separated from the eyed end of the rod which is also illustrated.

Referring to the drawings, the big-end of the locomotive connecting rod 1 consists of a solid forged circular eye or ring 2 carried integrally by the shank of the rod, which, in the best practice, is forged in such a manner that the fibres run continuously without interruption along the shank, round the eye 2, and back again along the shank as illustrated in Figure 5. In this figure, the thin lines indicate the direction of the unbroken fibres (or flow of metal) in a well-forged connecting rod. The tension stress lines coincide with the said lines causing uniform distribution of stress and consequent long fatigue life. The compressive stress lines will also coincide with above, but will not extend right round eye of rod. A groove 3 (Figures 3 and 5) of semi-circular section, is formed across the inner cylindrical periphery of said eye or ring 2, being disposed, as shown, at the inner side of the eye on the centre line of the shank, where the fibres of the shank diverge to pass round the eye. This formation is particularly suitable, since, as will be seen from Figure 5, the continuity of the fibres round the eye 2 is not interrupted. High concentrated stresses in the eye due to drilled holes are avoided, and the fatigue life of the rod will be the maximum. Although a single groove 3, placed as above described, is preferred, two small grooves might be used if kept close together in the area referred to. The eye 2 surrounds the crank-pin 4, in spaced relation thereto, and enclosed within the space between the eye 2 and the crank-pin 4 is an anti-friction bearing assembly. This bearing assembly consists of a double-row tapered-roller bearing composed of inner cone bearing members 5 on the crank-pin, two laterally-spaced rows of tapered rollers 6, and a single outer bearing ring or member 7 having two conical interior race surfaces engaged by the rollers, and also having a spherical exterior surface 7a for self-aligning purposes.

The bearing is enclosed and protected, at opposite sides, by two annular covers 8 the inner peripheries of which surround ribs 5a on the two inner bearing members or races, as shown. Near their outer edges the said covers 8 have short inwardly-projecting annular extensions 9 which fit closely within the connecting-rod eye 2, being inserted respectively from opposite sides, and being of a length such that they meet at the middle of the eye, where they are spigoted one within the other. Outwards of these annular extensions 9 the covers 8 are extended radially to form external flanges 8a which embrace the respective side faces of the eye 2.

The annular extensions 9 of the side covers 8 together form a spherical housing for the bearing, their inner surfaces being of a diameter and shape closely to engage the spherical exterior surface 7a of the outer bearing member 7. The said spherical surface of the outer bearing member 7 and the engaging inner surfaces of the annular cover extensions 9 are of corresponding spherical form, and the arrangement is such as to allow of a lateral rocking movement of the bearing relatively to the housing. The construction allows the spherical seats to be machined in pairs in an economical manner. The outer bearing member 7 is loosely anchored to the housing, formed by the cover extensions 9 to allow for self-aligning movements, but to prevent rotation round the crank pin, and the said housing, in turn, is locked to the connecting-rod eye 2 against circumferential movement, so that the outer bearing member 7 cannot turn within the said eye. For this purpose, the spherical exterior surface 7a of the outer bearing member 7 has cut in it a number of circumferentially-spaced straight transverse grooves 10 (see Figure 3) the bottoms of which are parallel to the axis, so that the grooves are deepest at the middle and become gradually shallower as they approach the sides of the spherical surface, until they merge into said surface. Correspondingly situated transverse holes 11 are drilled in the side covers 8 so as to pass through the annular extensions 9 of the same and break through into the spherical interior surfaces of the extensions to form, at the middle of the housing, transverse grooves 11a opposed to the respective grooves 10 in the outer bearing member. Bolts 12 (Figures 2 and 4) are passed through the aforesaid holes in the covers so that the exposed central portions of the bolts enter the grooves 10 of the bearing member and act as keys to prevent rotation of the housing. A slight clearance is provided between the bolt shanks and the grooves 10 to allow for the necessary self-aligning movements. At the same time the bolts 12 hold the two covers 8 together and clamp their outer flanges 8a against the faces of the connecting-rod eye 2.

In order positively to lock or anchor the spherical bearing housing to the connecting-rod eye 2, aligned grooves 13, of semi-circular section, are formed transversely across the cylindrical outer surfaces of the annular extensions 9 of the covers 8 and are each continued through the respective side flange of the cover in the form of a complete hole 13a (Figure 3) the said grooves 13 being opposed to the transverse groove 3 within the eye of the connecting rod to form therewith a complete passage. A bolt 14 is passed through the holes 13a in the opposite side flanges, so that it thereby closely engages the registering grooves 3 and 13 in the eye and in the annular cover extensions and rigidly key the parts together.

By the above arrangement the outer bearing member 7 is anchored to the spherical housing formed by the annular cover extensions 9 so that it may rock slightly relatively thereto in a transverse direction, so that it is self-aligning, but so that it is prevented from rotating relatively to the same, whilst the housing is positively secured to the connecting-rod eye 2 by the bolts 12 and 14 without cutting through any of the aforesaid fibres running round the rod eye, such as would cause stress concentrations around the bolt holes, thereby weakening the big end, the size and weight of which can thereby be kept down to a minimum.

In addition to the construction described having the advantages already mentioned, it allows the necessary close fit of the two-part spherical member to be readily adjusted by machining a small amount from the faces of the cover flanges 8a which abut against the sides of the eyed end of the rod.

The cover extensions 9, forming the spherical bearing housing, need not be spigotted together, whilst the central apertures in the covers 8 may be arranged to lie closely around the crank-pin 4, instead of around ribs 5a on the inner races or bearing members, as shown. A bearing comprising a single row of rollers may be used, or balls may be employed. Also, if desired, a bearing comprising a single spherical block with liner may be used in place of a ball or roller bearing.

If desired, where the clamping effect of the cover bolts 12 is great enough to prevent rotation of the bearing housing within the eye of the rod the groove or grooves in the eye 2 of the rod may be omitted, the bolt 14 being placed, in this case, in the same pitch-circle as the bolts 12.

I claim:

1. An eyed rod, a pin surrounded by the eye of the rod, a bearing member within the eye of the rod, the said bearing member having a spherical outer surface, side covers enclosing the bearing member, the said side covers together forming a spherical housing engaging the spherical surface of the bearing member, recesses in the bearing member, holes in the covers registering with the recesses in the bearing member and a plurality of bolts engaging the holes in the covers and the recesses in the bearing member, the said bolts holding the covers together and clamping them against the eye of the rod, and, at the same time, loosely keying the bearing member to the housing, so that the bearing member is prevented from rotating relatively to the housing, but may rock relatively thereto in a transverse direction.

2. An eyed rod, a pin surrounded by the eye of the rod, a bearing member within the eye of the rod, the said bearing member having a spherical outer surface, side covers enclosing the bearing member, the said covers together forming a spherical housing engaging the spherical surface of the bearing member, apertures in the covers, a groove in the eye of the rod, a bolt passing through the said apertures in the covers and engaging the groove in the eye of the rod so that the said bolt prevents the covers from turning within the eye of the rod and, at the same time, holds the covers together, grooves in the bearing member, grooves in the spherical housing registering with the first named grooves and a plurality of bolts engaging the registering recesses and loosely keying the bearing member to the housing, so that the said bearing member is prevented from rotating relatively to the housing, but may rock relatively thereto in a transverse direction.

3. An eyed rod, a pin surrounded by the eye of the rod, a bearing member within the eye of the rod between the eye and the pin, the said bearing member having a spherical outer surface, covers enclosing the bearing member at opposite sides, inwardly-projecting annular extensions on the side covers fitting within the eye of the rod and together forming a spherical housing engaging the spherical surface of the bearing member, a plurality of circumferentially-spaced transverse grooves in the bearing member, similarly disposed registering grooves in the annular cover extensions, and bolts passing through the grooves in the annular cover extensions and loosely engaging the grooves in the bearing member, the said bolts securing together the covers and clamping them against the eye of the rod, and also preventing the bearing member from turning within the spherical housing, whilst permitting it to rock transversely relatively thereto.

4. An eyed rod, a crank-pin extending through the eye of the rod, inner and outer bearing members within the eye of the rod and surrounding the crank-pin, the outer bearing member having a spherical surface, with peripherally-spaced transverse grooves extending across the latter, covers enclosing the bearing members at opposite sides, inwardly-projecting integral annular extensions on the side covers fitting within the eye of the rod and together forming a two-part housing with a spherical surface engaging the grooved spherical surface of the outer bearing member, holes in the side covers continuing into grooves extending across the spherical surface of the housing and registering with the grooves in the outer bearing member, and bolts passing through the holes in the side covers so as to hold the latter together and clamp them against the eye of the rod, the said bolts engaging the registering grooves in the housing and outer bearing member, and preventing the latter from rotating within the housing whilst allowing it to rock slightly in a transverse direction to render it self-aligning.

5. An eyed rod, a crank-pin extending through the eye of the rod, inner and outer bearing members within the eye of the rod and surrounding the crank-pin, the outer bearing member having a spherical outer surface, with peripherally-spaced transverse grooves extending across the latter, covers enclosing the bearing members at opposite sides, inwardly-projecting integral annular extensions on the side covers fitting within the eye of the rod and together forming a two-part housing with a spherical surface engaging the grooved spherical surface of the outer bearing member, holes in the side covers continuing into grooves extending across the spherical surface of the housing and registering with the grooves in the outer bearing member, bolts passing through the holes in the side covers so as to hold the latter together and clamp them against the eye of the rod, the said bolts engaging the registering grooves in the housing and outer bearing member, and preventing the latter from rotating within the housing whilst allowing it to rock slightly in a transverse direction to render it self-aligning, a groove in the eye of the rod, holes in the covers registering with the groove in the eye of the rod and a bolt engaging the said groove and holes, the said bolt serving to hold the covers together and also serving to prevent the covers from turning within the eye of the rod.

6. An eyed rod, a crank-pin surrounded by the eye of the rod, inner and outer bearing races separated by antifriction elements within the eye of the rod and surrounding the crankpin, the outer bearing race having a transversely-grooved spherical outer surface, covers engaging opposite sides of the eye of the rod and enclosing the bearing assembly, inwardly-projecting integral annular extensions on the side covers, having cylindrical outer faces and spherical inner faces, the said extensions having overlapping marginal portions and providing a two-part spherical housing which engages the grooved spherical surface of the outer bearing member, the covers having circumferentially-spaced holes continuing into grooves extending across the spherical surface of the housing, the said grooves registering with the grooves in the outer race, bolts passing through the holes in the covers and serving to secure the covers together and to clamp them against the eye of the rod, the said bolts engaging the grooves in the outer race, so that they also prevent the outer race from rotating within the housing whilst permitting it to rock slightly in a transverse direction to render it self-aligning, a groove extending across the outer face of the housing registering with a groove extending across the eye of the rod and disposed at the inner side of the said eye on the centre line of the rod, and a bolt engaging the said registering grooves in the housing and eye of the rod, the said bolt serving to secure the covers together and also to prevent them from turning within the eye of the rod.

ELDRED HERBERT DOUGHTY.